(12) United States Patent
Menon et al.

(10) Patent No.: US 11,776,537 B1
(45) Date of Patent: Oct. 3, 2023

(54) NATURAL LANGUAGE PROCESSING SYSTEM FOR CONTEXT-SPECIFIC APPLIER INTERFACE

(71) Applicant: Blue Lakes Technology Inc., Redondo Beach, CA (US)

(72) Inventors: Anand Menon, Redondo Beach, CA (US); Satyaprashvitha Nara, Lake Forest, CA (US)

(73) Assignee: Blue Lakes Technology, Inc., Lake Forest, CA (US)

( * ) Notice: Subject to any disclaimer, the term of this patent is extended or adjusted under 35 U.S.C. 154(b) by 0 days.

(21) Appl. No.: 18/077,227

(22) Filed: Dec. 7, 2022

(51) Int. Cl.
| G10L 15/26 | (2006.01) |
| G10L 15/183 | (2013.01) |
| G10L 15/22 | (2006.01) |

(52) U.S. Cl.
CPC ............ *G10L 15/183* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| 6,144,938 | A * | 11/2000 | Surace | ................ | H04M 3/4936 |
| | | | | | 704/E13.004 |
| 6,185,535 | B1 * | 2/2001 | Hedin | ..................... | G10L 15/30 |
| | | | | | 704/E15.047 |
| 6,757,362 | B1 * | 6/2004 | Cooper | .................. | H04M 3/527 |
| | | | | | 379/88.16 |
| 2005/0033582 | A1 * | 2/2005 | Gadd | ...................... | G10L 15/26 |
| | | | | | 704/E15.04 |
| 2005/0286689 | A1 * | 12/2005 | Vuori | ...................... | H04W 4/14 |
| | | | | | 379/88.22 |
| 2013/0013297 | A1 * | 1/2013 | Song | .................. | H04M 1/72436 |
| | | | | | 704/E15.001 |
| 2013/0132084 | A1 * | 5/2013 | Stonehocker | ........... | G10L 15/04 |
| | | | | | 704/244 |
| 2013/0304758 | A1 * | 11/2013 | Gruber | .................. | G06F 16/248 |
| | | | | | 707/769 |

(Continued)

OTHER PUBLICATIONS

Trademark Status & Document Retrieval, Oct. 6, 2022.

*Primary Examiner* — Neeraj Sharma
(74) *Attorney, Agent, or Firm* — Carr & Ferrell LLP

(57) ABSTRACT

A computer-implemented method is provided to optimize natural language processing of voice interaction data in product/service categorization and product/service application. The computer-implemented method receives, from a voice interaction device through a context discovery interface, user voice data corresponding to a user. Furthermore, the computer-implemented method performs, with an NLP engine, natural language processing of the user voice data to determine a context category. Additionally, the computer-implemented method selects, with an AI engine, one of a plurality of context-specific applier interfaces based on the context category. The computer-implemented method automatically transitions, with the AI engine, to said one of the plurality of context-specific applier interfaces. Finally, the computer-implemented method interacts, via the AI engine, with the user via a voice interaction to initiate the product/service application.

17 Claims, 9 Drawing Sheets

(56) References Cited

U.S. PATENT DOCUMENTS

| | | | |
|---|---|---|---|
| 2015/0281401 A1* | 10/2015 | Le | G06F 40/20 |
| | | | 709/203 |
| 2016/0379638 A1* | 12/2016 | Basye | G10L 15/22 |
| | | | 704/235 |
| 2017/0374502 A1* | 12/2017 | Gabel | G06Q 50/26 |
| 2019/0034539 A1* | 1/2019 | Gavrielides | H04L 61/4594 |
| 2019/0385057 A1* | 12/2019 | Litichever | H04L 63/14 |

* cited by examiner

NATURAL LANGUAGE PROCESSING SYSTEM FOR CONTEXT-SPECIFIC APPLIER INTERFACE

BACKGROUND

1. Field

This disclosure generally relates to computing systems. More particularly, the disclosure relates to natural language processing ("NLP") computing systems.

2. General Background

Conventional configurations provide time-consuming user interfaces that allow users to apply for various products and services, such as mortgage products. For instance, a wizard application will typically require that a user manually inputs various information via a series of forms with input fields. To further complicate matters, a user may have to fill out multiple online forms (i.e., a form for each product/service).

As such, conventional technologies do not provide an adequate solution for the Internet-centric problem of providing efficient interaction between users and remote computing systems, specifically for the application of products/services.

SUMMARY

In one aspect, a computer-implemented method is provided to optimize natural language processing of voice interaction data in product/service categorization and product/service application. The computer-implemented method receives, from a voice interaction device through a context discovery interface, user voice data corresponding to a user. Furthermore, the computer-implemented method performs, with a natural language processing ("NLP") engine, natural language processing of the user voice data to determine a context category. Additionally, the computer-implemented method selects, with an artificial intelligence ("AI") engine, one of a plurality of context-specific applier interfaces based on the context category. The computer-implemented method automatically transitions, with the AI engine, to said one of the plurality of context-specific applier interfaces. Finally, the computer-implemented method interacts, via the AI engine, with the user via a voice interaction to initiate the product/service application.

As an alternative, a computer program product may have a computer readable storage device with a computer readable program stored thereon that implements the computer-implemented method. As yet another alternative, a computerized system may be utilized to implement the computer-implemented method.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An NLP system is provided for determining a particular context, which then allows for a context-specific applier interface to be utilized by a user for interaction with an AI system. The NLP system allows for a voice-based interactions with the user to identify what particular product/service a user wishes to apply for, and then the NLP system seamlessly transitions to an interface (solely audio or a combination of audio and video/imagery) that allows the user to apply for the that product or service. In other words, the NLP system performs a discovery process for identifying what product/service category the user is interested in and then allows the user to apply for that identified product/service.

Figure 1:
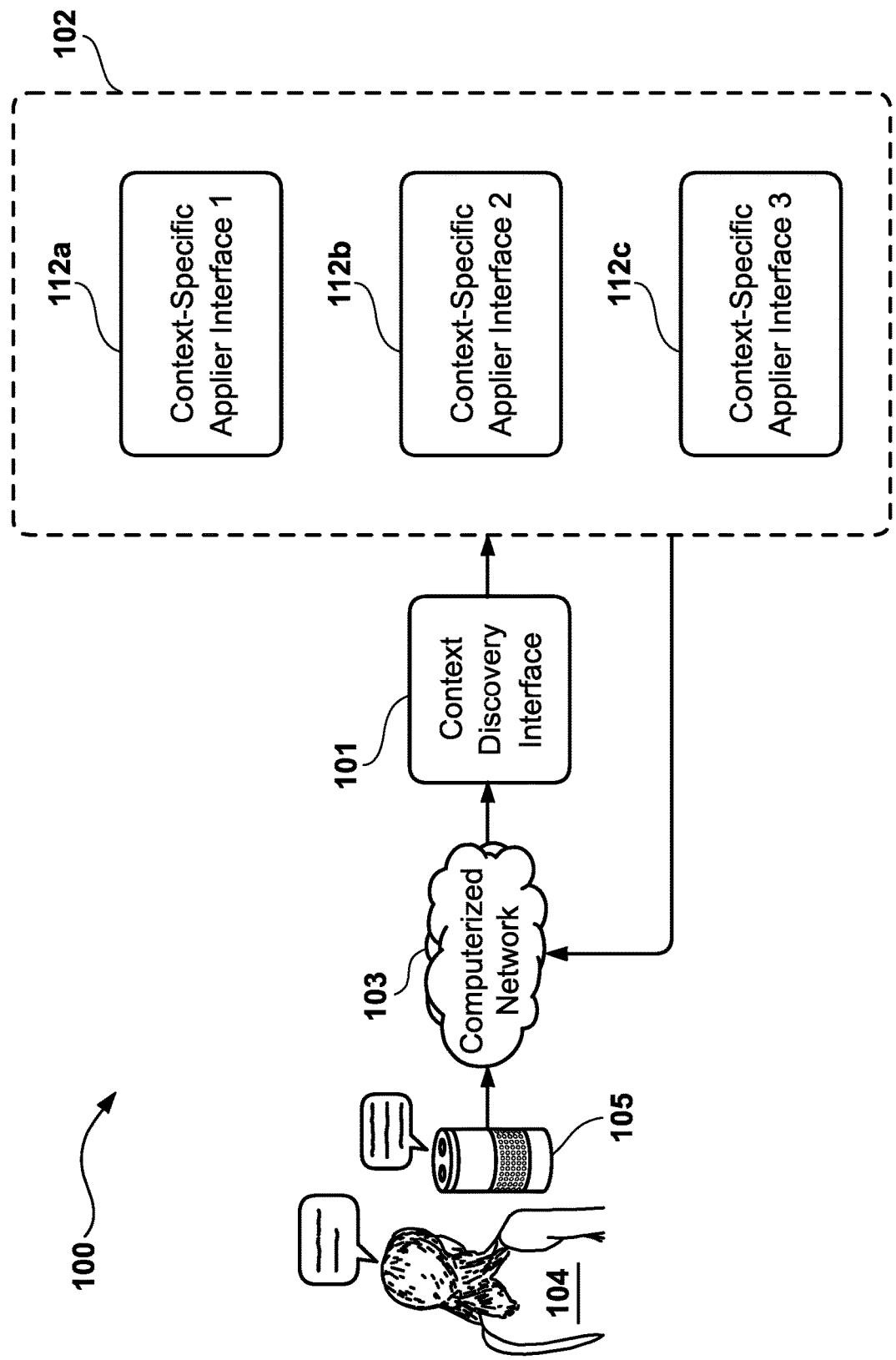
FIG. 1 illustrates a context discovery configuration.

FIG. 1 illustrates a context discovery configuration 100. In particular, a user 104 may provide voice interaction data with a voice interaction device 105 such as a voice-controlled virtual assistant. (Other devices with voice synthesis capabilities, such as mobile phones, smart watches, laptop computers, virtual reality headsets, etc. may be used as the voice interaction device 105.) The voice interaction device 105 may provide the user voice data through a computerized network 103 to a context discovery interface 101. (Although a cloud-based configuration is illustrated, in an alternative embodiment, the context discovery interface 101 may be implemented locally through the voice interaction device 105, home network, or other device in communication with the voice interaction device 105.)

The context discovery interface 101 allows for a determination, through natural language processing of the voice interactions with the user 104, of the particular context category through which the user may wish to apply for a product/service. As such, the context discovery interface 101 is utilized to determine which of a plurality of context-specific applier interfaces 102 (e.g., a first context-specific applier interface 112a, a second context-specific applier interface 112b, and a third context-specific applier interface 112c), the user 104 intends to apply for a product or service. As an example, three context-specific applier interfaces are illustrated, whereby the first context-specific applier interface 112a may be for mortgage finance products, the second context-specific applier interface 112b may be for travel-related products, and the third context-specific applier interface 112c may be for dining-related services. (Although three context-specific applier interfaces are illustrated, a lesser or greater number of context-specific applier interfaces for similar or different products/services may be utilized as the plurality of context-specific applier interfaces 102.) Each context-specific interface requires a different interaction with the user 104 to obtain the requisite information for that particular context. For example, for the first context-specific applier interface 112a, a series of questions would be presented to obtain information such as the property address, the current mortgage interest rate, the desired refinance rate, etc. As another example, for the second context-specific applier interface 112b, a series of questions would be presented to obtain information such as the intended destination, travel dates, number people travelling, etc. Finally, as yet another example, for the third context-specific applier interface 112c, a series of questions would be presented to obtain information such as a restaurant of interest, the desired reservation time, and the number of people dining.

Prior to the selection of the most suitable context-specific applier interface, the context discovery interface 101 may iterate with the user 104 through voice-based interactions to ensure that the correct context-specific applier interface is selected with a high degree of confidence. To accomplish this, the context discovery interface matches key words from each particular context with the words uttered by the user 104.

Figure 2:
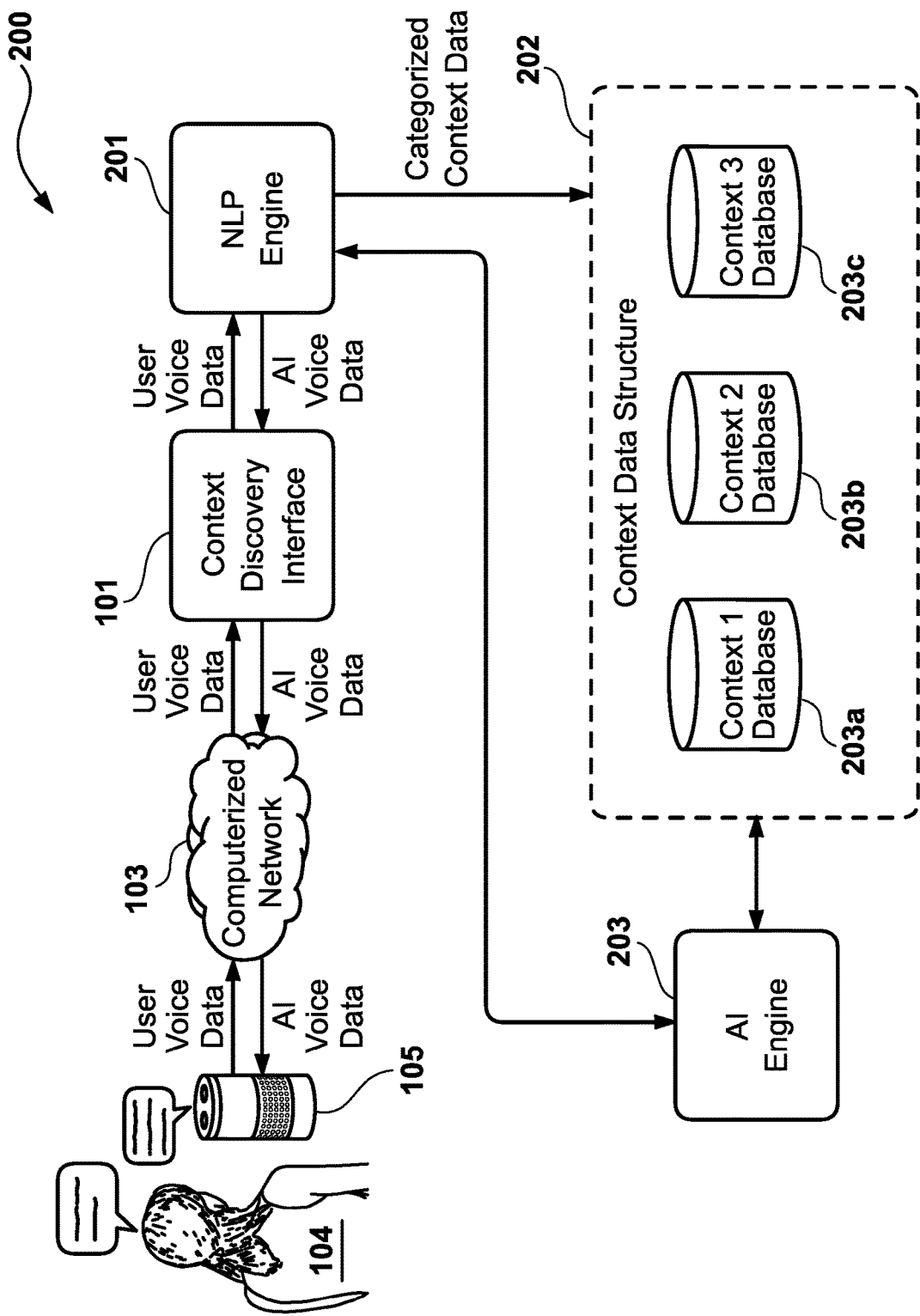
FIG. 2 illustrates an NLP configuration that is utilized by the context discovery interface illustrated in FIG. 1 to identify the particular context.

FIG. 2 illustrates an NLP configuration 200 that is utilized by the context discovery interface 101 illustrated in FIG. 1 to identify the particular context. Upon receiving the user voice data, the context discovery interface 101 provides that data to an NLP engine 201 that performs natural language processing on the data to categorize the context data based on matching data from a context data structure 202. In particular, the context data structure 202 may have a plurality of context databases 203a-203c, each configured to store matching data particular to a given context. (Three context databases are illustrated only as examples; a lesser or greater number of databases may be used instead.) For example, the first context database 203a may store key terms particular to the mortgage refinance product category, such as "refinance" and "interest rate". When the user 104 speaks, an AI engine 203 searches through the different context databases 203a-203c to probabilistically determine which context is the most likely context for which the user 104 wishes to apply for a product or service. For instance, overlaps may occur in which terms uttered by the user 104 may be appear in multiple context databases. To resolve such overlaps, additional terms may be searched for through the context data structure 202 to determine additional terms for which there is no overlap as one or more distinguishing factors.

Figure 3:
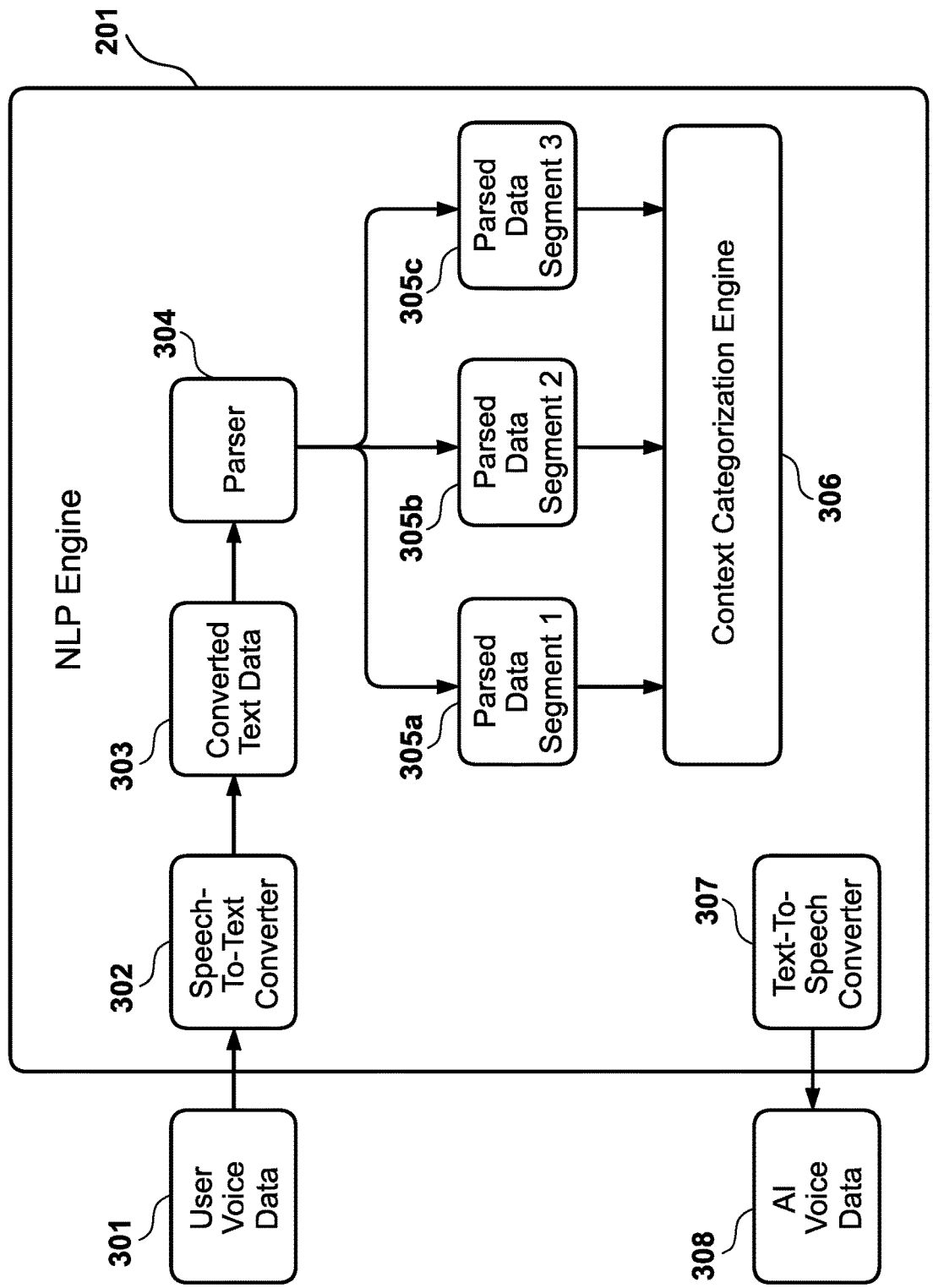
FIG. 3 illustrates an expanded view of the NLP engine illustrated in FIG. 2.

FIG. 3 illustrates an expanded view of the NLP engine 201 illustrated in FIG. 2. Particularly, user voice data 301 is ingested by the NLP engine 201. A speech-to-text converter 302 converts the voice data into converted text data 303. Subsequently, a parser 304 parses the converted text data into parsed data segments 305a-305c. (Three data segments are illustrated only as an example. More or less data segments may result from the parsing.) In one embodiment, the parser 304 parses the data by referencing the context data structure 202, illustrated in FIG. 2, on a predetermined quantity of words basis. For example, if the predetermined quantity is one, the parser 304 references the context data structure 202 for each word to search for whether that word is a key context term stored in one or more of the context databases 203a-203c. If the word is present within one of more of the context databases 203a-203c, the parser 304 parses the unparsed converted text data 303 up until that point into a parsed data segment, and then proceeds to parsing the remainder of the unparsed converted text data 303. Conversely, if the word is not present within one of more of the context databases 203a-203c, the parser 304 continues on to the next word for reference to the context data structure 202.

Upon completion of parsing the converted text data 303 into the plurality of parsed data segments 305a-305c, a context categorization engine 306 may categorize the parsed data segments as being of a particular context category. Returning to FIG. 2, the AI engine 203 may then probabilistically determine, based upon the various categories of context data for the different parsed data segments, a likelihood of the voice interaction as a whole being directed to one particular context. For example, twenty percent of the parsed data segments may be categorized as directed to travel, whereas eighty percent of the parsed data segments may be categorized as directed to a mortgage refinance product. For instance, a user 104 may say the following "Hello, I want to travel more, so I want to get more savings on my mortgage payment to allow me to do that." Although the user 104 mentions the word "travel," the user 104 is not interested in a travel product; rather, the user 104 is interested in a mortgage refinance product. If the AI engine 203 focuses too much on the travel aspect of the conversation with the user 104, the AI engine 203 will transition to the incorrect context-specific applier interface from the plurality of context-specific applier interfaces 102. Accordingly, the AI engine 203 may focus on the higher frequency of terminology pertaining to mortgage refinance used in the sentence than travel. To accomplish this, the AI engine 203 may have a frequency probabilistic threshold (i.e., a threshold that is utilized to probabilistically demarcate one predetermined quantity of terms from another as being a likely indicator of intent to apply for that product/service.) Additionally or alternatively, the AI engine 203 may focus on surrounding terminology that is indicative of intent. For instance, in the example provided above, the AI engine 203 may focus on the term "savings" to assess that the intent of what the user 104 is seeking to apply for is a mortgage refinance product rather than a travel product—at least for that current interaction. Accordingly, the AI engine 203 may utilize a surrounding terminology weighting to weight certain terms over others (e.g., "savings" may lead to weighting of "mortgage payment").

The NLP engine 201 solves the Internet-centric challenge of providing meaningful, realistic technology, which allows users 104 speak in a natural, conversational manner with the AI engine 203—as if speaking with a human being; without having provided manual inputs via a keyboard or other similar input device. Furthermore, the NLP engine 201 utilizes such natural communication to discover, and differentiate amongst which applier interface is that which is intended by the user 104 to be used to apply for a product/service. Overlapping terminology will occur with some degree of frequency, and the NLP engine 201 provides a mechanism to resolve such overlaps through the frequency probabilistic threshold and/or surrounding terminology weighting. Accurately determining the correct applier interface significantly helps provide users 104 with a degree of confidence in using the context discovery configuration 100 illustrated in FIG. 1 rather than input via conventional means (e.g., via a keyboard); without such an accurate determination, users 104 will end up applying for unintended products/services.

Upon determining the appropriate context (e.g., mortgage refinance), the NLP engine 201 may utilize a text-to-speech converter 307 to convert text generated by the AI engine 203, responsive to the user 104 as part of the interaction, into AI voice data 308. In one embodiment, the AI engine 203 may generate a response to the user 104 indicative of the context identified by the AI engine; in essence, a confirmatory response that is conveyed in a natural, conversational manner. As an example, the AI engine 203 may respond to the user's comment from above as follows: "Ok, I understand that you are seeking to refinance your mortgage. What type of savings are you seeking for your monthly mortgage payment?" Alternatively, the AI engine 203 may seek further validation if the probabilistic threshold(s) and weighting(s) are not met by iterating with the context discovery interface 101 until those probabilistic threshold(s)/weighting(s) are met. For example, the AI engine 203 may provide additional questions to obtain additional terminology that may be parsed by the parser 304 to add to what has already been calculated by the AI engine 203 for purposes of probabilistic assessment.

Figure 4:
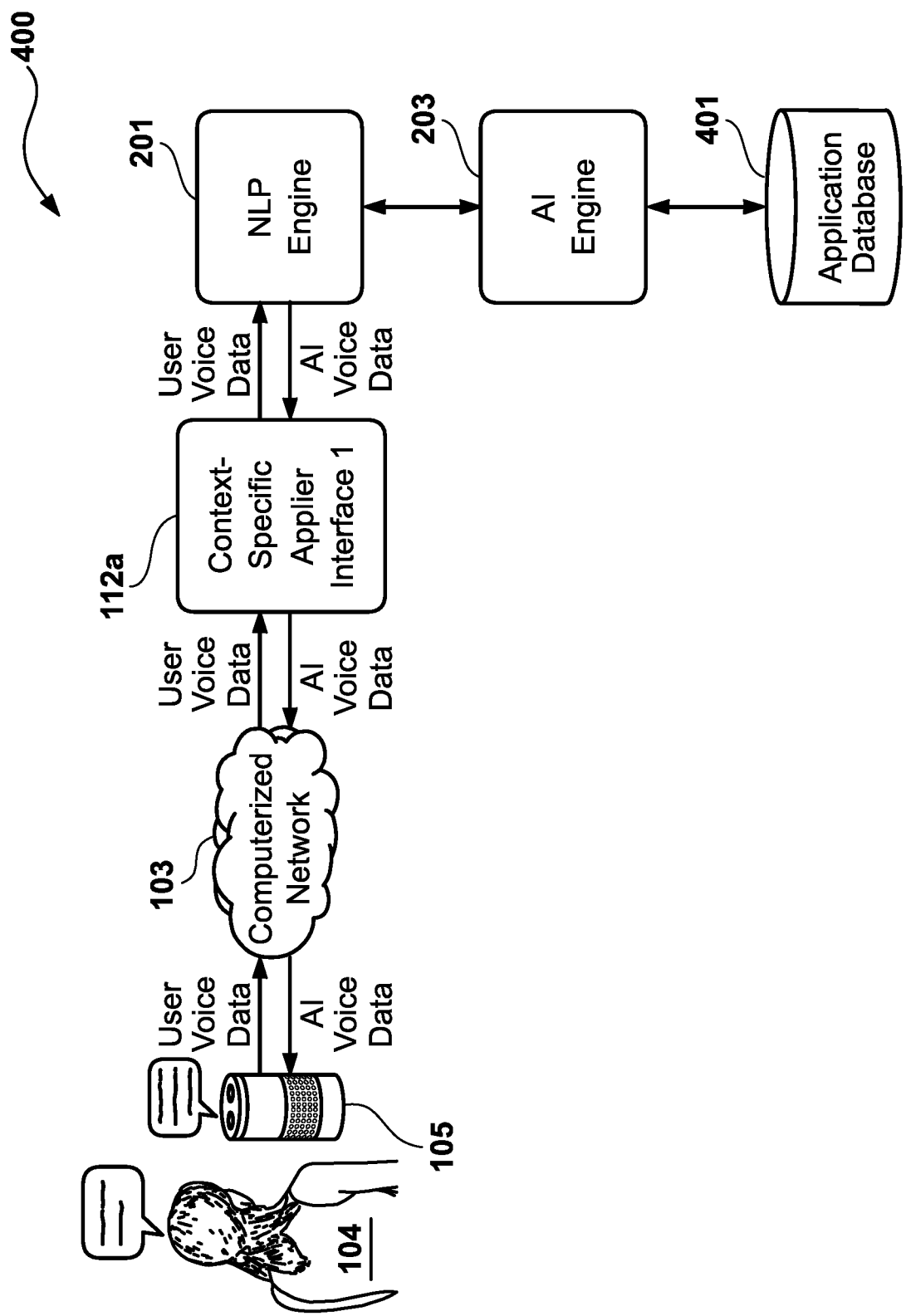
FIG. 4 illustrates an automatic transition to an applier configuration.
Figure 5:
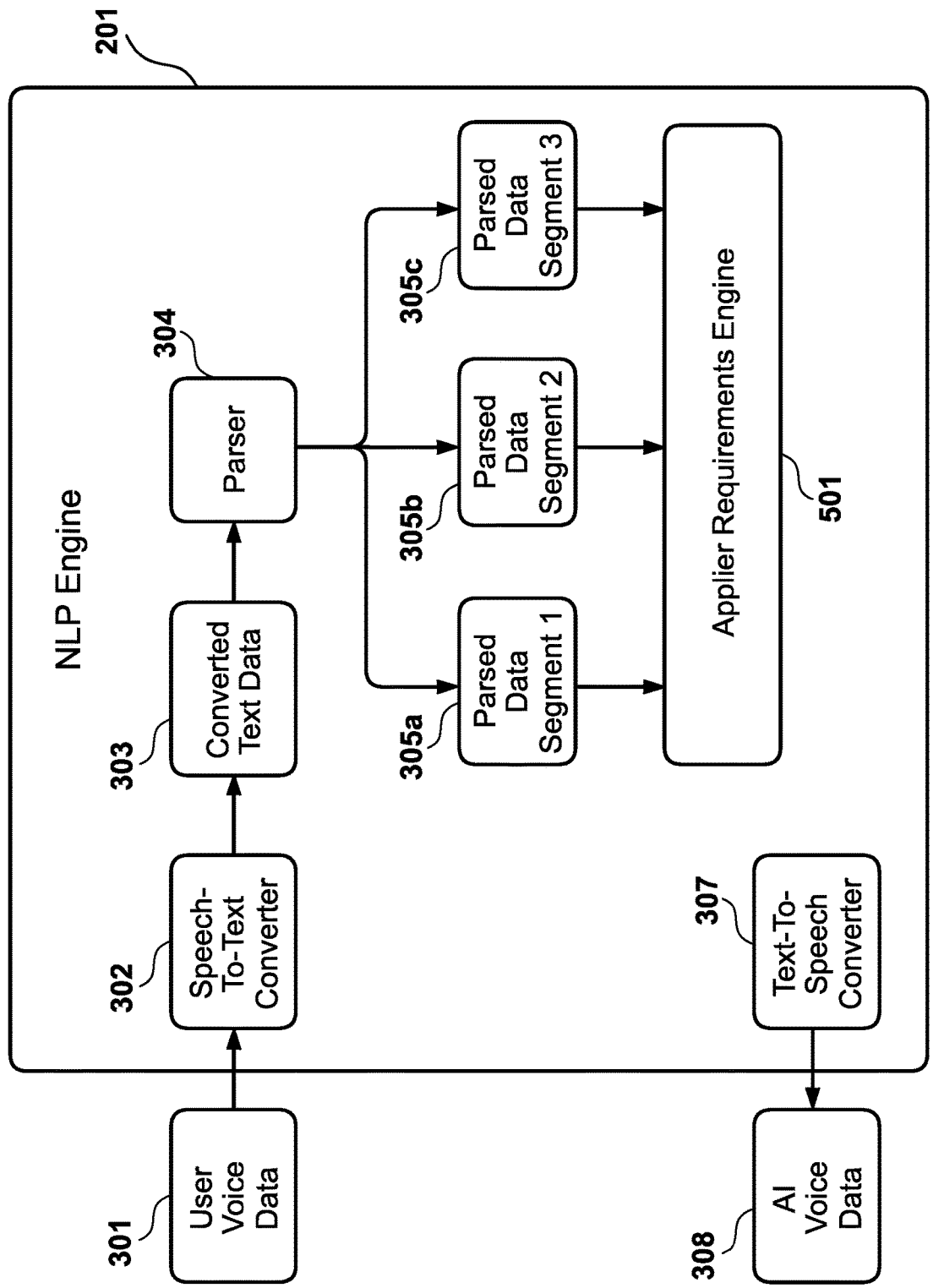
FIG. 5 illustrates the NLP engine behaving similarly in that voice data is converted and parsed, but differently in that an applier requirements engine extracts particular data that is most pertinent to applying for the particular product/service.

Upon the determination of the appropriate context-specific applier interface, the NLP configuration 200, illustrated in FIG. 2, automatically transitions to an applier configuration 400, as illustrated in FIG. 4, in which the user continues the conversation with the AI engine 203 as part of one seamless conversation. In other words, the NLP configuration 200 identifies the particular context through the context discovery interface 101 and then transitions in a manner that is not perceptible to the user 104 to a different interface, namely the particular context-specific interface. Via discovery and application, the technology provided for in these configurations allows the user to perceive a unified, seamless, and natural conversation. As an example, the first context-specific applier interface 112a, relating to mortgage refinance products, has been transitioned to by the NLP configuration 200 within the applier configuration 400. Just as with the NLP configuration 200, the NLP engine 201 may be utilized to process the natural language data—in this instance with the first context-specific applier interface 112a rather than the context discovery interface 101. Turning to FIG. 5, the NLP engine 201 behaves similarly in that voice data is converted and parsed, but differently in that an applier requirements engine 501 extracts particular data that is most pertinent to applying for the particular product/service. For instance, for the first context-specific applier interface 112a, the applier requirements engine 501 may require the following information: (i) property address, (ii) current lender information, and (iii) current interest rate, (iv) desired savings and/or desired interest rate. These requirements allow the AI engine 203 to generate applications for relevant mortgage refinance products, and transmit those applications to lender computing systems when certain conditions are met. The application(s) may be stored in an application database 401 for subsequent transmission when and if those conditions are met. Rather than a wizard or a form-based approach, the applier requirements engine 501 may obtain the requisite information in an unordered, conversational manner. For example, the applier requirements engine 501 may being with the fourth requirement (e.g., desired savings). Based on the user's response, AI engine 203 through the applier requirements engine 501 may then determine the next requirement to address through one or more interactions with the user 104. For example, if the user 104 responds saying that he is paying his lender six percent, the AI engine 203 may ask: "who is your lender?" Accordingly, the AI engine 203 attempts to obtain information based in as realistic a conversational manner as possible. In one embodiment, the AI engine 203 utilizes a conversational realism threshold in which the AI engine 203 selects queries and responses to user communications based on the probability of such queries and responses maintaining tying into the previous user communications or predetermined user attributes. For example, when the user 104 mentioned the phrase lender, the AI engine 203 may establish with a high degree of confidence that a question of the user 104 regarding the name of the user's lender would be a reasonable next part of the interaction.

Figure 6:
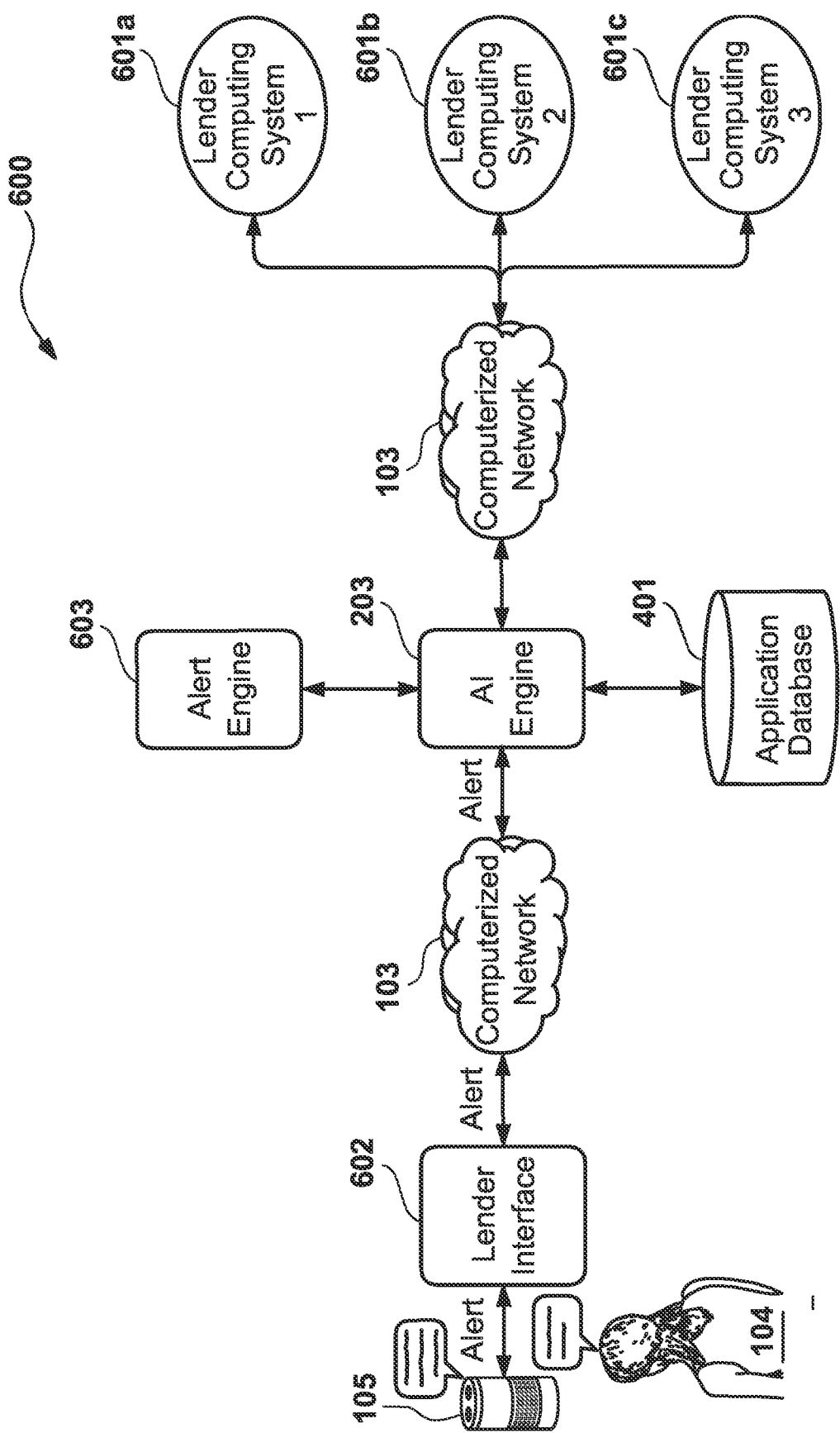
FIG. 6 illustrates a communication configuration in which the AI engine provides an application to one or more lender computing systems based upon an automatic trigger of all of the application requirements being met.

As an example, the user 104 may indicate a particular interest rate threshold that is not applicable that day but is available a month later. At that time, an automatic trigger is invoked by the AI engine 203 to transmit the application. FIG. 6 illustrates a communication configuration 600 in which the AI engine 203 provides an application to one or more lender computing systems 601a-601c based upon an automatic trigger of all of the application requirements being met. The AI engine 203 may also provide an automatic alert, via an alert engine 603, to the user 104, through a lender interface 602, indicating that the application has been sent and to which lenders. The alert may be provided via a voice alert, and may be provided via a natural conversational manner. Furthermore, an additional or alternative alert may be sent to the user 104 indicative of the outcome of the application via the various lenders.

In one embodiment, the interactive context discovery session illustrated in FIGS. 1 and 2 are timed. For instance, a context discovery session may be active for a predetermined time period (e.g., five minutes). After the predetermined time period expires, the context and all of the other relevant information may be deleted if a context has not been fully established.

Figure 7:
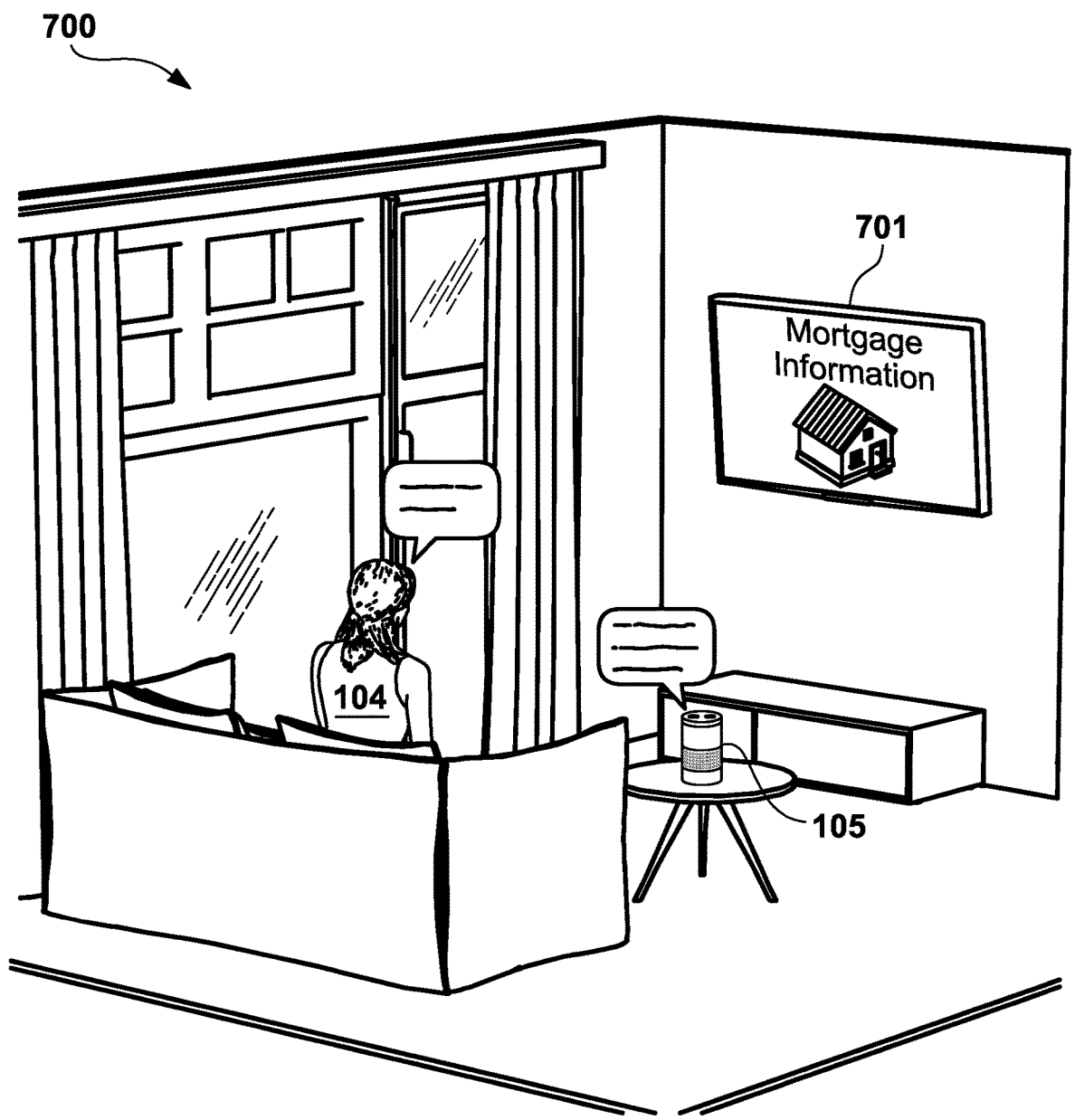
FIG. 7 illustrates a voice interaction environment.

FIG. 7 illustrates a voice interaction environment 700. The user 104 is situated within the voice interaction environment 700, interacting with the voice interaction device 105. Furthermore, a visual display device 701 (e.g., television, computer monitor, etc.) may be situated within the voice interaction environment 700. As an example, the user 104 may initiate a conversation with the voice interaction device 105, which then commences a context discovery process that transitions to an application process for a product, such as a mortgage refinance product. In one embodiment, the conversation between the user 104 and the AI engine 203, via the voice interaction device 105, may be supplemented with one or more visual renderings via the visual display device 701.

While the user 104 is speaking with the AI engine 203, the visual display device 701 may render images or videos of content pertaining to the application process. As an example, for a mortgage refinance product, the visual display device 701 may render images of the property, current refinance rates, current news regarding refinancing, a copy of the refinance application, etc., during the context discovery and/or application processes. As another example, for a travel-related product, the visual display device 701 may render imagery or video of the intended destination of the user 104. As yet another example, for a dining-related product, the visual display device 701 may render imagery or audio of the menu or cuisine for a particular restaurant.

In another embodiment, the voice interaction environment 700 may be implemented without the visual display device 701; in other words, the interaction between the user 104 and the AI engine 203 may be performed solely through an audio-based interface.

Although the configurations provided for herein have been described with respect to voice interactions, other forms of interaction may be performed via such configurations as an alternative. For example, the configurations provided for herein may be implemented via a chat-based system or an image/video-based system.

Figure 8:
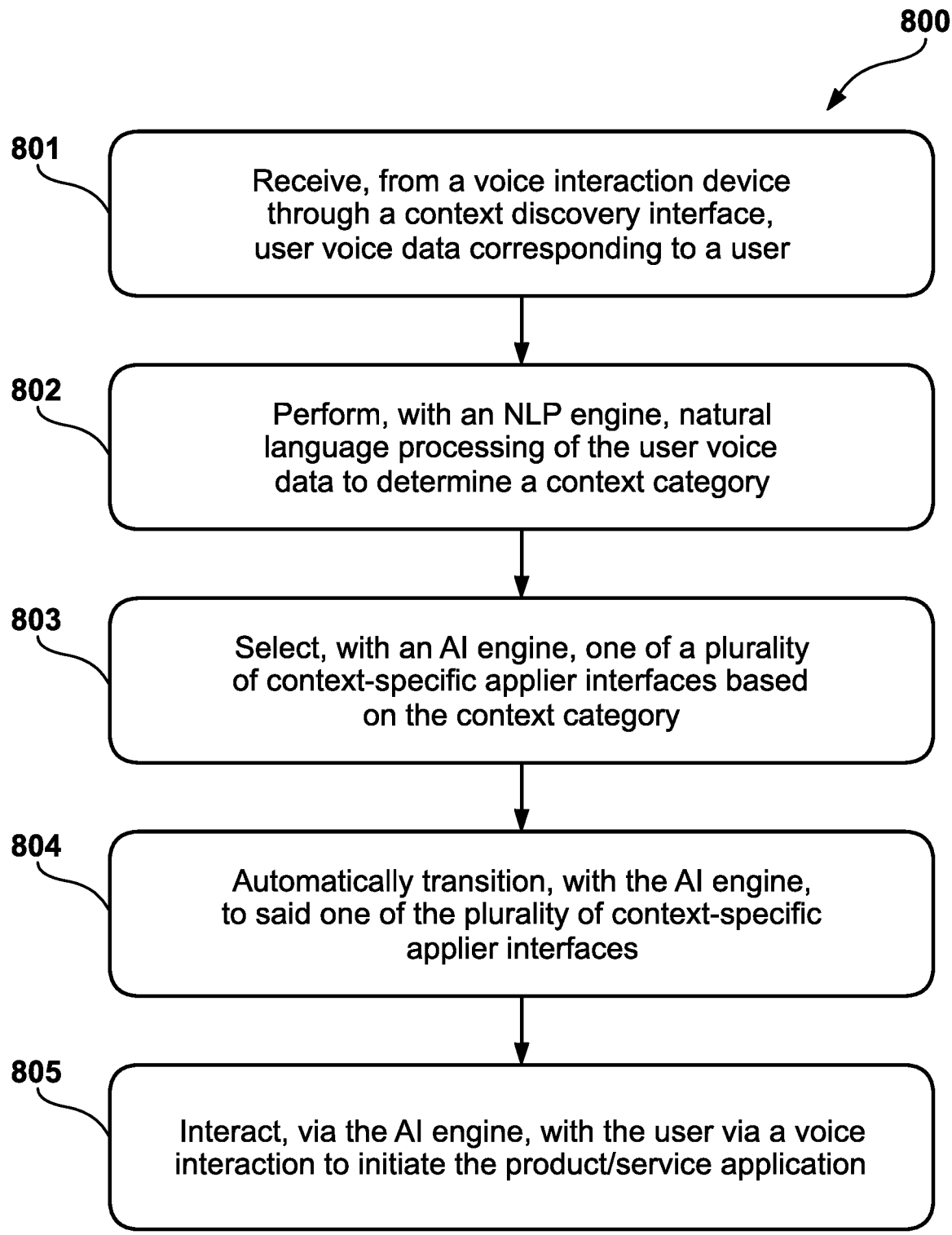
FIG. 8 illustrates a computer-implemented method that optimizes natural language processing of voice interaction data in product/service categorization and product/service application.

FIG. 8 illustrates a computer-implemented method 800 that optimizes natural language processing of voice interaction data in product/service categorization and product/service application. At a process block 801, the computer-implemented method 800 receives, from a voice interaction device through a context discovery interface, user voice data corresponding to a user 104. Furthermore, at a process block 802, the computer-implemented method 800 performs, with the NLP engine 201, natural language processing of the user voice data to determine a context category. Additionally, at a process block 803, the computer-implemented method 800 selects, with the AI engine 203, one of a plurality of context-specific applier interfaces based on the context category. At a process block 804, the computer-implemented method 800 automatically transitions, with the AI engine 203, to one of the plurality of context-specific applier interfaces. Finally, at a process block 805, the computer-implemented method 800 interacts, via the AI engine 203, with the user via a voice interaction to initiate the product/service application.

Figure 9:
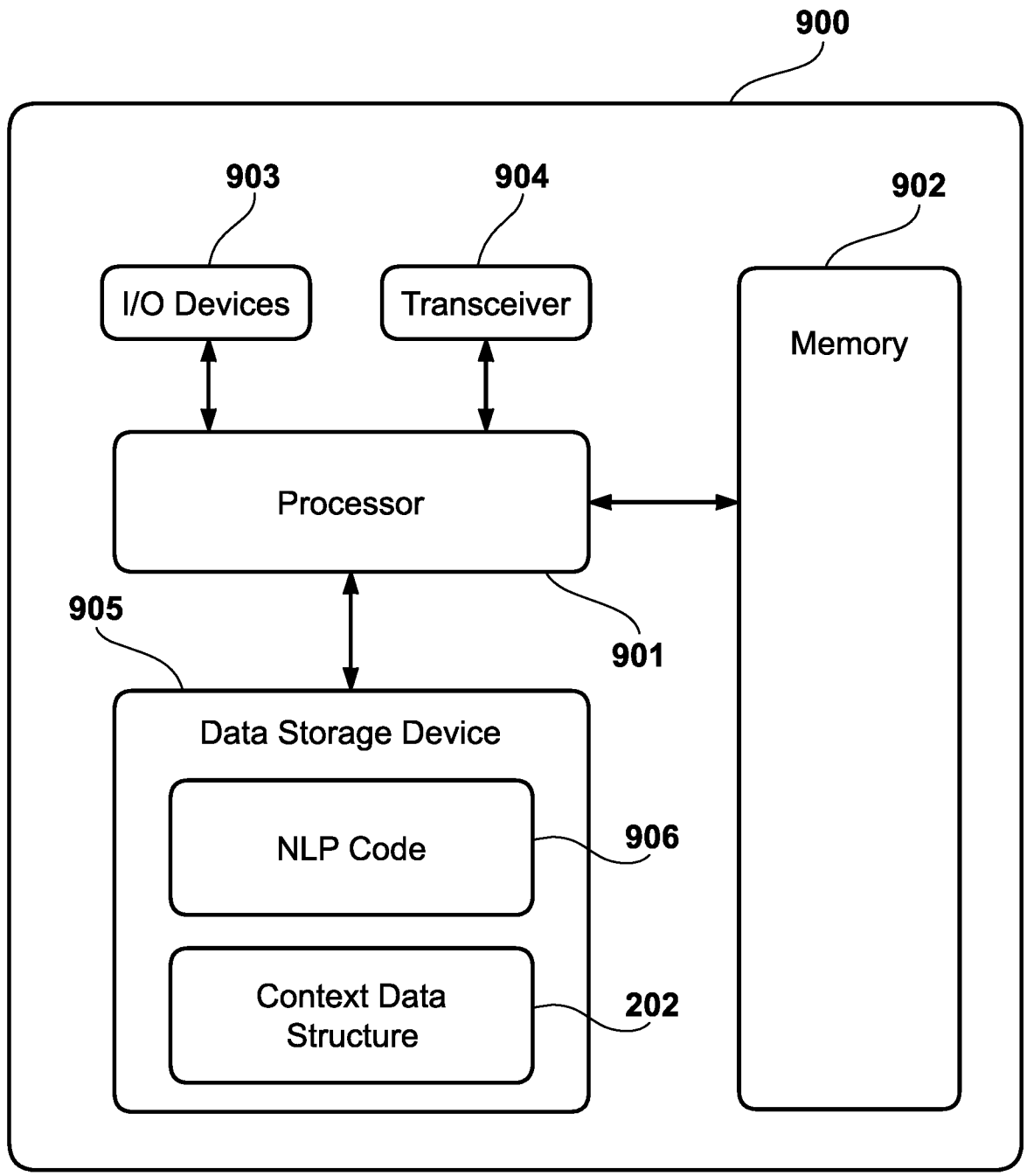
FIG. 9 illustrates a system configuration that implements the context discovery configuration illustrated in FIG. 1 and the applier configuration illustrated in FIG. 4.

FIG. 9 illustrates a system configuration 900 that implements the context discovery configuration 100 illustrated in FIG. 1 and the applier configuration illustrated in FIG. 4. In particular, a processor 901, which may be specialized to operate in conjunction with the NLP engine 201 and the AI engine 203, may be used to perform the operations illustrated in FIGS. 1-8. Furthermore, a memory device 902 may store the context data structure 202. The memory device 902 may also store computer readable instructions performed by the processor 901. As an example of such computer readable instructions, a data storage device 905 within the system configuration may store NLP code 906 and the context data structure 202.

Moreover, the system configuration may have one or more input/output ("I/O") devices 903 that may receive inputs and provide outputs. Various devices (e.g., keyboard, microphone, mouse, pointing device, hand controller, etc.) may be used for the I/O devices 903. The system configuration may also have a transceiver 904 to send and receive data. Alternatively, a separate transmitter and receiver may be used instead.

Furthermore, various illustrations have depicted computing devices such as mobile computing devices and desktop computers. However, the configurations provided for herein may be implemented via other types of computing devices (e.g., laptops, tablet devices, smartwatches, etc.). A computer is intended herein to include any device that has a specialized processor as described above. For example, a computer may be a personal computer ("PC"), laptop computer, set top box, cell phone, smartphone, tablet device, smart wearable device, portable media player, video player, etc.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer-implemented method of optimizing natural language processing of voice interaction data in product/service categorization and product/service application, comprising:

receiving, from a voice interaction device through a context discovery interface, user voice data corresponding to a user;

performing, with an NLP engine, natural language processing of the user voice data to determine a context category;

selecting, with an AI engine, one of a plurality of context-specific applier interfaces based on the context category;

automatically transitioning, with the AI engine, to said one of the plurality of context-specific applier interfaces;

interacting, via the AI engine, with the user via a voice interaction to initiate the product/service application;

converting the user voice data to converted text;

parsing the converted text into a plurality of parsed data segments;

searching a plurality of context databases to determine if a match exists between each of the plurality of parsed data segments and each of the plurality of context databases; and generating a demarcation point in the converted text at a point at which the match was determined.

2. The computer-implemented method of claim 1, further comprising parsing a remainder of the converted text after the demarcation point.

3. The computer-implemented method of claim 1, further comprising probabilistically determining that the converted text meets a frequency probabilistic threshold of being directed to the context category based upon a quantity of the plurality of parsed data segments corresponding to the context category.

4. The computer-implemented method of claim 1, further comprising probabilistically determining that the converted text meets a probabilistic threshold of being directed to the context category based upon a weighting of one or more of the plurality of parsed data segments corresponding to the context category.

5. The computer-implemented method of claim 4, wherein the weighting is based on surrounding terminology corresponding to the context category.

6. The computer-implemented method of claim 1, further comprising probabilistically resolving an overlap existing in more than one of the plurality of context databases.

7. The computer-implemented method of claim 1, further comprising assessing, via the AI engine, whether a conversational realism threshold is met.

8. The computer-implemented method of claim 1, further comprising generating an alert based upon the product/service application being transmitted to a product/service provider.

9. A computer program product comprising a non-transitory computer-readable storage device having computer code embodied therein to optimize natural language processing of voice interaction data in product/service categorization and product/service application, which, when executed on a computing device, causes the computing device to:

receive, from a voice interaction device through a context discovery interface, user voice data corresponding to a user;

perform, with an NLP engine, natural language processing of the user voice data to determine a context category;

select, with an AI engine, one of a plurality of context-specific applier interfaces based on the context category;

automatically transition, with the AI engine, to said one of the plurality of context-specific applier interfaces;

interact, via the AI engine, with the user via a voice interaction to initiate the product/service application;

convert the user voice data to converted text;

parse the converted text into a plurality of parsed data segments;

search a plurality of context databases to determine if a match exists between each of the plurality of parsed data segments and each of the plurality of context databases; and probabilistically determine that the converted text meets a frequency probabilistic threshold of being directed to the context category based upon a quantity of the plurality of parsed data segments corresponding to the context category.

10. The computer program product of claim 9, wherein the computing device is further caused to generate a demarcation point in a converted text at the point at which the match was determined.

11. The computer program product of claim 10, wherein the computing device is further caused to parse a remainder of the converted text after the demarcation point.

12. The computer program product of claim 9, wherein the computing device is further caused to probabilistically determine that the converted text meets a probabilistic threshold of being directed to the context category based upon a weighting of one or more of the plurality of parsed data segments corresponding to the context category.

13. The computer program product of claim 12, wherein the weighting is based on surrounding terminology corresponding to the context category.

14. The computer program product of claim 9, wherein the computing device is further caused to probabilistically resolve an overlap existing in more than one of the plurality of context databases.

15. The computer program product of claim 9, wherein the computing device is further caused to assess, via the AI engine, whether a conversational realism threshold is met.

16. The computer program product of claim 9, wherein the computing device is further caused to generate an alert based upon the product/service application being transmitted to a product/service provider.

17. A computer program product comprising a non-transitory computer-readable storage device having computer code embodied therein to optimize natural language processing of voice interaction data in product/service categorization and product/service application, which, when executed on a computing device computing device, causes the computing device to:

receive, from a voice interaction device through a context discovery interface, user voice data corresponding to a user;

perform, with an NLP engine, natural language processing of the user voice data to determine a context category;

select, with an AI engine, one of a plurality of context-specific applier interfaces based on the context category;

automatically transition, with the AI engine, to said one of the plurality of context-specific applier interfaces;

interact, via the AI engine, with the user via a voice interaction to initiate the product/service application;

convert the user voice data to converted text;

parse the converted text into a plurality of parsed data segments;

search a plurality of context databases to determine if a match exists between each of the plurality of parsed data segments and each of the plurality of context databases; and probabilistically determine that the converted text meets a probabilistic threshold of being directed to the context category based upon a weighting of one or more of the plurality of parsed data segments corresponding to the context category.

* * * * *